United States Patent
LoRicco et al.

(10) Patent No.: US 10,697,307 B2
(45) Date of Patent: Jun. 30, 2020

(54) HYBRID COOLING SCHEMES FOR AIRFOILS OF GAS TURBINE ENGINES

(71) Applicant: United Technologies Corporation, Farmington, CT (US)

(72) Inventors: Nicholas M. LoRicco, Windsor, CT (US); Ricardo Trindade, Mansfield, CT (US); Dominic J. Mongillo, Jr., West Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/875,500

(22) Filed: Jan. 19, 2018

(65) Prior Publication Data

US 2019/0226344 A1 Jul. 25, 2019

(51) Int. Cl.
 *F01D 5/18* (2006.01)
 *F01D 9/06* (2006.01)

(52) U.S. Cl.
 CPC ............. *F01D 5/187* (2013.01); *F01D 9/065* (2013.01); *F05D 2220/32* (2013.01); *F05D 2240/12* (2013.01); *F05D 2240/124* (2013.01); *F05D 2240/81* (2013.01); *F05D 2260/201* (2013.01); *F05D 2260/2212* (2013.01); *F05D 2260/22141* (2013.01)

(58) Field of Classification Search
 CPC . F01D 5/187; F01D 9/06; F01D 9/065; F05D 2220/32; F05D 2240/12; F05D 2240/81; F05D 2260/201
 See application file for complete search history.

(56) References Cited

U.S. PATENT DOCUMENTS 3,628,880 A * 12/1971 Smuland ................ F01D 5/189
 415/175
4,288,201 A 9/1981 Wilson
 (Continued)

FOREIGN PATENT DOCUMENTS

EP 1571296 A1 9/2005
EP 1643081 A2 4/2006
 (Continued)

OTHER PUBLICATIONS

European Search Report for European Application No. 19152897.5, International Filing Date Jan. 21, 2019, dated Jun. 18, 2019, 7 pages.

*Primary Examiner* — Richard A Edgar
*Assistant Examiner* — Michael K. Reitz
(74) *Attorney, Agent, or Firm* — Cantor Colburn LLP

(57) ABSTRACT

Airfoils for gas turbine engines are provided. The airfoils include an airfoil body extending between a first platform and a second platform, a first platform feed cavity defined by the first platform, a second platform exit cavity defined by the second platform, a first hybrid skin core cooling cavity passage formed within the airfoil body and fluidly connecting the first platform feed cavity to the second platform exit cavity, and at least one purge aperture formed in the second platform and fluidly connecting the second platform exit cavity to an exterior of the second platform. The airfoil body does not include any apertures fluidly connecting the first hybrid skin core cooling cavity passage to an exterior of the airfoil body.

20 Claims, 5 Drawing Sheets

(56) References Cited

U.S. PATENT DOCUMENTS

| | | | |
|---|---|---|---|
| 4,798,515 A * | 1/1989 | Hsia | F01D 5/18 |
| | | | 415/115 |
| 5,320,485 A * | 6/1994 | Bourguignon | F01D 5/187 |
| | | | 415/115 |
| 5,772,398 A | 6/1998 | Noiret et al. | |
| 8,347,945 B1 | 1/2013 | Taffet et al. | |
| 8,403,632 B2 | 3/2013 | Surace et al. | |
| 8,944,763 B2 * | 2/2015 | Lee | F01D 5/087 |
| | | | 416/97 R |
| 9,021,816 B2 | 5/2015 | Bergman et al. | |
| 9,151,164 B2 | 10/2015 | Tardif et al. | |
| 2017/0198595 A1 * | 7/2017 | Allen | F01D 9/041 |
| 2017/0234144 A1 * | 8/2017 | Mugglestone | F01D 5/188 |
| | | | 415/178 |

FOREIGN PATENT DOCUMENTS

| | | |
|---|---|---|
| EP | 3056680 A1 | 8/2016 |
| GB | 2546841 A | 8/2017 |

* cited by examiner

HYBRID COOLING SCHEMES FOR AIRFOILS OF GAS TURBINE ENGINES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, local internal cooling flow characteristics may result in localized hot spot metal regions where the incorporation of various convective and film cooling design concepts may be limiting and/or non-optimal due to restrictions associated with conventional core tooling and casting manufacturing processes that prohibit more robust and optimal cooling configurations to be integrated into current state-of-the-art cooling concepts. In order to mitigate the inherent variability associated with conventional vane baffle impingement-film cooling design concepts it becomes desirable to design cooling concepts that enable more robust approaches to tailoring and optimizing thermal cooling requirements based on the local distribution of external heatload. Accordingly, improved means for providing cooling within an airfoil may be desirable.

BRIEF DESCRIPTION

According to some embodiments, airfoils for gas turbine engines are provided. The airfoils include an airfoil body extending between a first platform and a second platform, a first platform feed cavity defined by the first platform, a second platform exit cavity defined by the second platform, a first hybrid skin core cooling cavity passage formed within the airfoil body and fluidly connecting the first platform feed cavity to the second platform exit cavity, and at least one purge aperture formed in the second platform and fluidly connecting the second platform exit cavity to an exterior of the second platform. The airfoil body does not include any apertures fluidly connecting the first hybrid skin core cooling cavity passage to an exterior of the airfoil body.

In addition to one or more of the features described herein, or as an alternative, further embodiments of the airfoils may include a second platform feed cavity defined by the second platform, a first platform exit cavity defined by the first platform, a second hybrid skin core cooling cavity passage formed within the airfoil body and fluidly connecting the second platform feed cavity to the first platform exit cavity, and at least one purge aperture formed in the first platform and fluidly connecting the first platform exit cavity to an exterior of the first platform. The airfoil body does not include any apertures fluidly connecting the second hybrid skin core cooling cavity passage to an exterior of the airfoil body.

In addition to one or more of the features described herein, or as an alternative, further embodiments of the airfoils may include at least one thermal transfer augmentation feature within the first hybrid skin core cooling cavity passage.

In addition to one or more of the features described herein, or as an alternative, further embodiments of the airfoils may include that the first hybrid skin core cooling cavity passage is located within the airfoil body along a suction side of the airfoil body.

In addition to one or more of the features described herein, or as an alternative, further embodiments of the airfoils may include that the first hybrid skin core cooling cavity passage has a variable first cavity width along a flow direction from the first platform feed cavity to the second platform exit cavity.

In addition to one or more of the features described herein, or as an alternative, further embodiments of the airfoils may include that the first cavity width is larger at the first platform feed cavity and smaller at the second platform exit cavity such that the first hybrid skin core cooling cavity passage tapers in a direction from the first platform feed cavity to the second platform exit cavity.

In addition to one or more of the features described herein, or as an alternative, further embodiments of the airfoils may include a leading edge cavity within the airfoil body and a trailing edge cavity within the airfoil body.

In addition to one or more of the features described herein, or as an alternative, further embodiments of the airfoils may include that the first hybrid skin core cooling cavity passage is positioned within the airfoil body such that the first hybrid skin core cooling cavity passage is defined between an exterior surface of the airfoil body and an interior wall that defines a wall of the trailing edge cavity.

In addition to one or more of the features described herein, or as an alternative, further embodiments of the airfoils may include that the first platform feed cavity is defined in part by a cover plate installed to the first platform.

In addition to one or more of the features described herein, or as an alternative, further embodiments of the airfoils may include that the second platform exit cavity is defined in part by a cover plate installed to the second platform.

According to some embodiments, gas turbine engines are provided. The gas turbine engines include an airfoil having an airfoil body extending between a first platform and a second platform, a first platform feed cavity defined by the first platform, a second platform exit cavity defined by the second platform, a first hybrid skin core cooling cavity passage formed within the airfoil body and fluidly connecting the first platform feed cavity to the second platform exit cavity, and at least one purge aperture formed in the second platform and fluidly connecting the second platform exit cavity to an exterior of the second platform. The airfoil body does not include any apertures fluidly connecting the first hybrid skin core cooling cavity passage to an exterior of the airfoil body.

In addition to one or more of the features described herein, or as an alternative, further embodiments of the gas turbine engines may include that the airfoil further includes a second platform feed cavity defined by the second platform, a first platform exit cavity defined by the first platform, a second hybrid skin core cooling cavity passage formed within the airfoil body and fluidly connecting the second platform feed cavity to the first platform exit cavity, and at least one purge aperture formed in the first platform and fluidly connecting the first platform exit cavity to an exterior of the first platform. The airfoil body does not include any apertures fluidly connecting the second hybrid skin core cooling cavity passage to an exterior of the airfoil body.

In addition to one or more of the features described herein, or as an alternative, further embodiments of the gas turbine engines may include that the airfoil further includes at least one thermal transfer augmentation feature within the first hybrid skin core cooling cavity passage.

In addition to one or more of the features described herein, or as an alternative, further embodiments of the gas turbine engines may include that the first hybrid skin core cooling cavity passage is located within the airfoil body along a suction side of the airfoil body.

In addition to one or more of the features described herein, or as an alternative, further embodiments of the gas turbine engines may include that the first hybrid skin core cooling cavity passage has a variable first cavity width along a flow direction from the first platform feed cavity to the second platform exit cavity.

In addition to one or more of the features described herein, or as an alternative, further embodiments of the gas turbine engines may include that the first cavity width is larger at the first platform feed cavity and smaller at the second platform exit cavity such that the first hybrid skin core cooling cavity passage tapers in a direction from the first platform feed cavity to the second platform exit cavity.

In addition to one or more of the features described herein, or as an alternative, further embodiments of the gas turbine engines may include that the airfoil further includes a leading edge cavity within the airfoil body and a trailing edge cavity within the airfoil body.

In addition to one or more of the features described herein, or as an alternative, further embodiments of the gas turbine engines may include that the first hybrid skin core cooling cavity passage is positioned within the airfoil body such that the first hybrid skin core cooling cavity passage is defined between an exterior surface of the airfoil body and an interior wall that defines a wall of the trailing edge cavity.

In addition to one or more of the features described herein, or as an alternative, further embodiments of the gas turbine engines may include that at least one of the first platform feed cavity and the second platform exit is defined in part by a cover plate installed to the respective first platform or second platform.

In addition to one or more of the features described herein, or as an alternative, further embodiments of the gas turbine engines may include that the airfoil is installed within a main gaspath of the gas turbine engine, and the at least one purge aperture is arranged to purge air from within the second platform exit cavity into the main gaspath.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
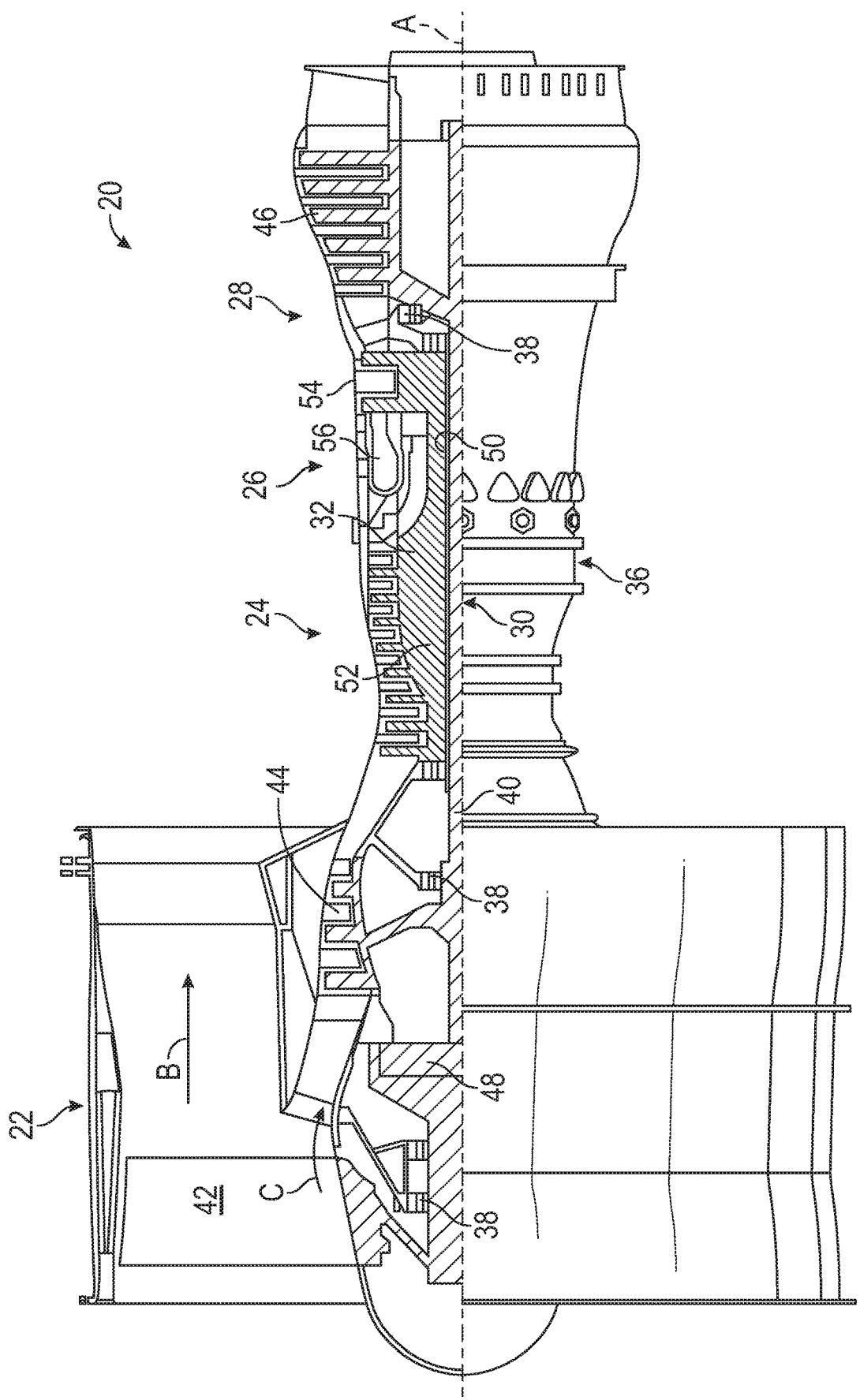
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(514.7° R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
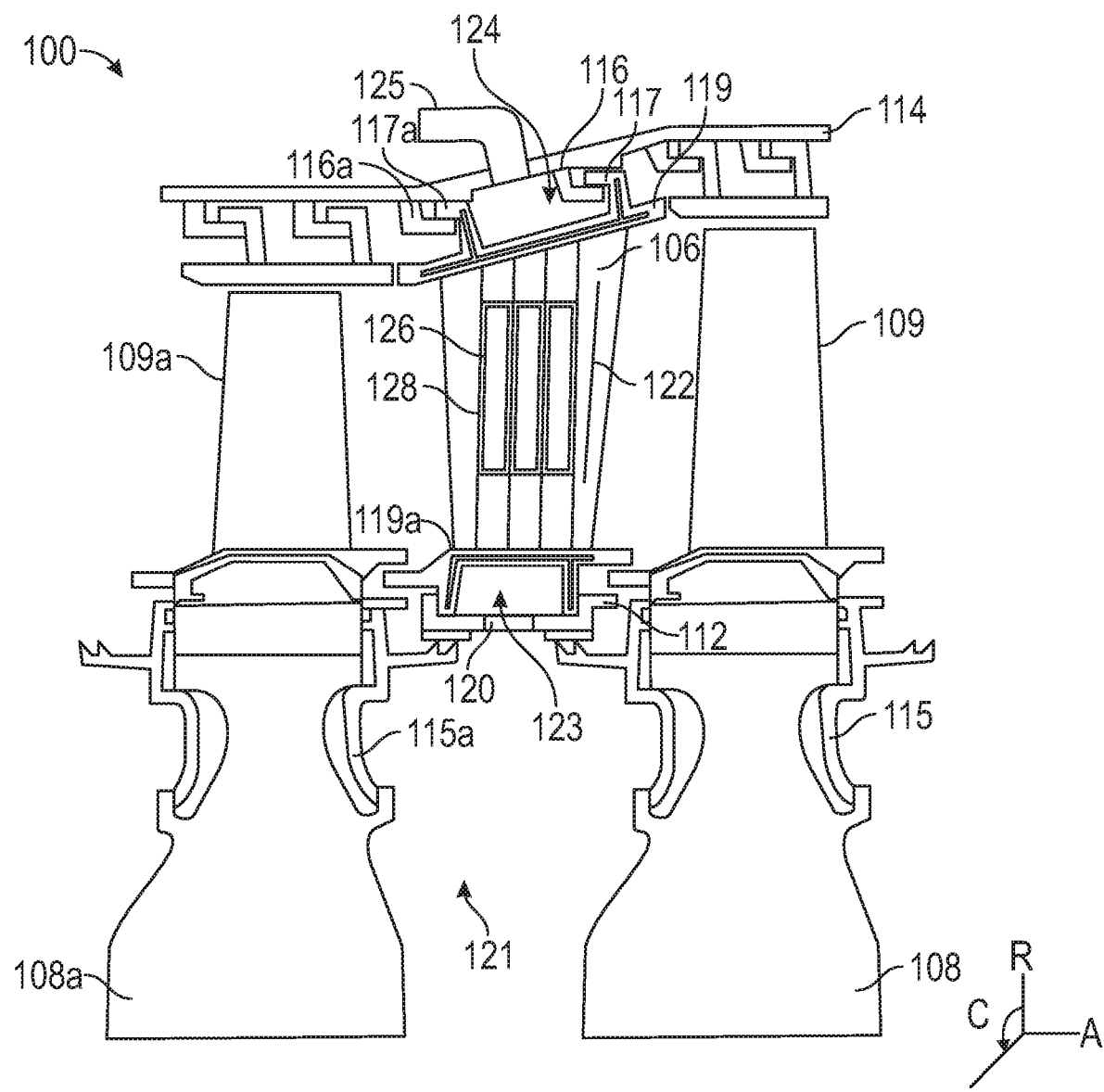
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

A turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119, 119a can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Film cooling is used for airfoils. Cooling air can be directed into internal cavities of the airfoils and then purged or bled through film cooling holes on the exterior walls/surfaces of the airfoils. The purged or bled air will form a film on the exterior surface of the airfoil and provide film cooling thereto. However, introducing cooling flow back into the gaspath as film cooling incurs a cycle penalty, lowering TSFC, particularly in post-gage point locations on the convex side of an airfoil where mixing losses are particularly high. Accordingly, it may be desirable to cool such locations utilizing more effective localized internal backside convection rather than ejecting cooling air via film holes at airfoil locations which inherently increase aerodynamic losses adversely impacting turbine efficiency.

In view of this, embodiments provided herein are directed to cooling schemes for airfoil cooling configurations that employ two opposing, converging mini-core or hybrid skin core cavities to convectively cool a post-gage convex portion of the airfoil. As used herein, the term "hybrid" when referring to a skin core cooling cavity passage of an airfoil or other gas turbine engine component is a cavity with a double-walled cooling channel having one wall exposed to a hot temperature fluid and the other wall not exposed to the hot temperature fluid. Further, the term can refer to single passages or multiple passages within an airfoil that have similar features. As such, the term circuit, incorporate one or more passages, may be employed as a term for describing the cooling air flow paths within airfoils and/or platforms of the present disclosure. For example, a hybrid skin core cavity of the present disclosure may be an internal cavity with an external hot wall that is exposed to a hot gaspath and an internal cold wall that is not exposed to the hot gaspath. In accordance with embodiments, the hybrid skin core cavities converge or taper in a radially direction. Such tapered hybrid skin core cavities can increase heat transfer as the cooling air heats up as it flows through the hybrid skin core cavities. Further, rather than bleeding air from the hybrid skin core cavities as a film on the airfoil, the hybrid cavities connect to a platform cooling passage. The air within the platform hybrid skin core cooling passage will discharge cooling air flow through film cooling holes along the inner diameter and/or outer diameter platform gaspath surfaces and/or along mating surfaces with adjacent components. Advantageously, such arrangement allows for the same cooling air to cool both a portion of the airfoil and the platform exterior surfaces concurrently, through at least two passages concurrently. It will be appreciated that although within some of the illustrative embodiments described herein, only one airfoil hybrid skin core cooling passage and one platform hybrid skin core cooling passage are shown, it should be understood that there may be at least two hybrid skin core cooling passages (or circuits). That is, in some embodiments, one airfoil hybrid skin core cooling passage (or circuit) may feed multiple hybrid platform skin core cooling passages or circuits and vice versa.

Figure 3A:
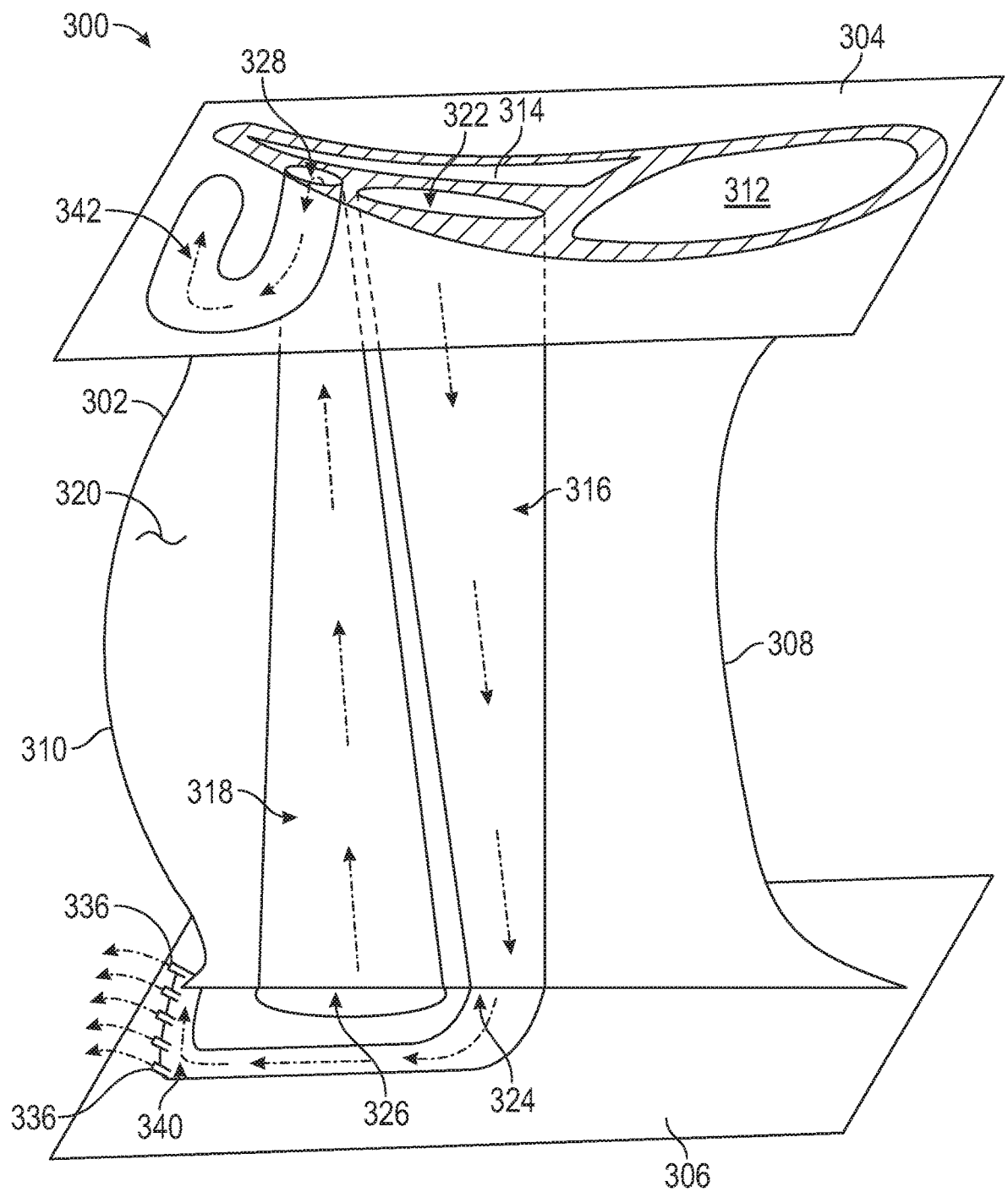
FIG. 3A is an isometric illustrative schematic of an airfoil in accordance with an embodiment of the present disclosure.
Figure 3B:
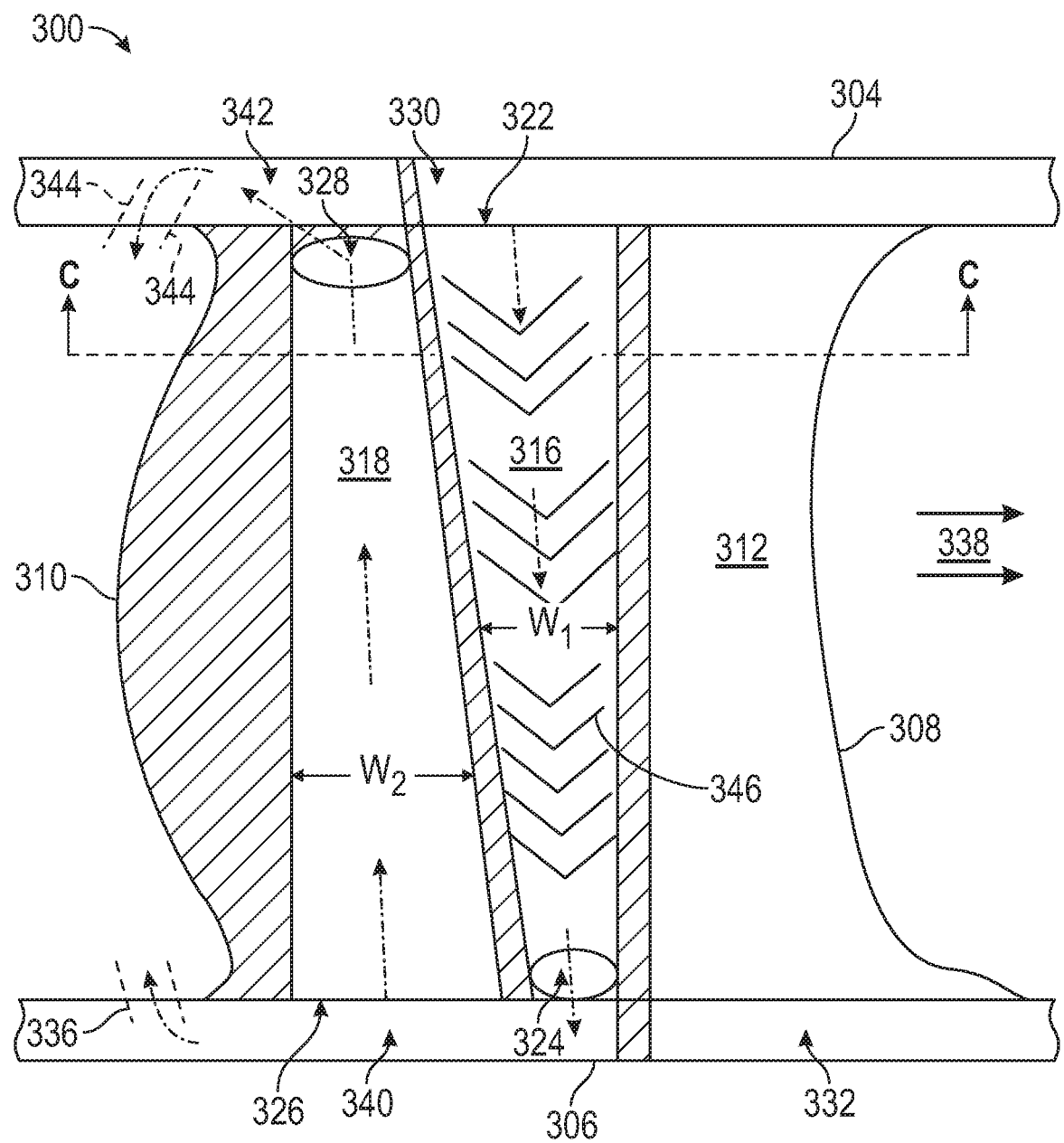
FIG. 3B is a side view elevation cross-sectional illustration of the airfoil of FIG. 3A as viewed along the line B-B shown in FIG. 3C.
Figure 3C:
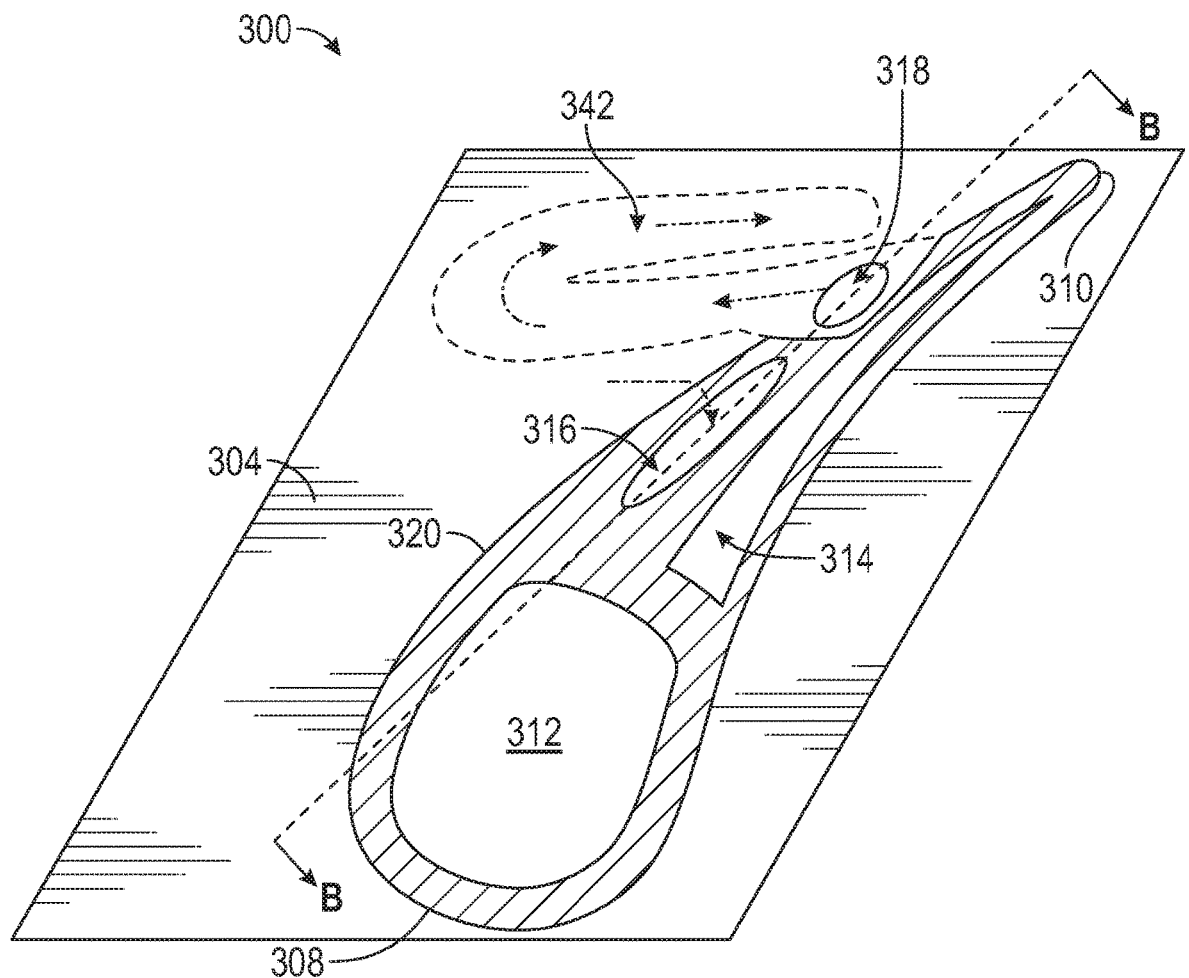
FIG. 3C is a cross-sectional illustration of the airfoil of FIG. 3A as viewed along the line C-C shown in FIG. 3B.

Turning now to FIGS. 3A-3C, schematic illustrations of an airfoil 300 in accordance with an embodiment of the present disclosure are shown. As shown, the airfoil 300 includes an airfoil body 302 extending between a first platform 304 and a second platform 306. The airfoil body 302 extends between a leading edge 308 and a trailing edge 310. As shown, the airfoil 300 is arranged as a vane which can be installed within a gas turbine engine, as will be appreciated by those of skill in the art. FIG. 3A is an isometric illustrative schematic of the airfoil 300, FIG. 3B is a side view elevation cross-sectional illustration of the airfoil 300 as viewed along the line B-B shown in FIG. 3C, and FIG. 3C is a cross-sectional illustration of the airfoil 300 as viewed along the line C-C shown in FIG. 3B.

The airfoil body 302 includes internal cooling cavities which are arranged to enable cooling of the airfoil 300. As shown, the airfoil 300 includes a leading edge cavity 312, a trailing edge cavity 314, a first hybrid skin core cooling cavity passage 316, and a second hybrid skin core cooling cavity passage 318. Although shown with a particular arrangement of internal cooling cavities, those of skill in the art will appreciate that various other arrangements and/or numbers of cooling cavities can be provided within an airfoil without departing from the scope of the present disclosure. The first hybrid skin core cooling cavity passage 316 and the second hybrid skin core cooling cavity passage 318 are formed with a hot wall being a suction side 320 of the airfoil 300 and a cold wall being a wall of the trailing edge cavity 314. As shown in FIG. 3B, the first hybrid skin core cooling cavity passage 316 has a first cavity width $W_1$ and the second hybrid skin core cooling cavity passage 318 has a second cavity width $W_2$.

The hybrid skin core cooling cavity passages of the present disclosure may have low hydraulic diameters. For example, the hybrid skin core cooling cavity passage may have a width W (e.g., $W_1$, $W_2$ shown in FIG. 3B) that is a distance along the hot or cold wall of the hybrid skin core cooling cavity passage (e.g., axial or chord-wise direction relative to the airfoil) and a height H that is a distance or length between the hot wall and the cold wall of the hybrid skin core cooling cavity passage (e.g., circumferential direction with respect to the airfoil), where the aspect ratio of a cooling channel passage is defined as the ratio of the height H to the width W (H/W). In some embodiments, the hybrid skin core cooling cavity passages may have a varying height and width along a length thereof. The height H and/or width W can be varied along the length (e.g., $H_{first\ end} \neq H_{second\ end}$ and/or $W_{first\ end} \neq W_{second\ end}$ in the radial span-wise and chord-wise directions). However, some of the hybrid skin core cooling cavity passages of airfoils of the present disclosure may be uniform in dimension, and thus the present illustrations and description are merely for illustrative and explanatory purposes, and no limitation is intended.

Each of the first and second hybrid skin core cooling cavity passages 316, 318 are fluidly connected such that an airflow can pass between the first and second platforms 304, 306. For example, as shown in FIG. 3B, the first hybrid skin core cooling cavity passage 316 has a first cavity inlet 322 formed in the first platform 304 and a first cavity outlet 324 formed in the second platform 306. Thus, cooling flow through the first hybrid skin core cooling cavity passage 316 will flow from the first platform 304 toward the second platform 306, from the respective first cavity inlet 322 to the first cavity outlet 324. The second hybrid skin core cooling cavity passage 318 has a counter-flow direction as compared to the flow through the first hybrid skin core cooling cavity passage 316, with a second cavity inlet 326 formed in the second platform 306 and a second cavity outlet 328 formed in the first platform 304.

The first and second hybrid skin core cooling cavity passages 316, 318 are fed with cooling air from the respective platforms 304, 306 in which the inlets 322, 326 are formed. For example, as shown in FIG. 3B, a first platform feed cavity 330 can be formed within or by the first platform 304 and fluidly connected to the first hybrid skin core cooling cavity passage 316 at the first cavity inlet 322. At the first cavity outlet 324, the first hybrid skin core cooling cavity passage 316 is fluidly connected to a second platform exit cavity 332, which may be defined by the second platform 306 and/or a cover plate, as will be appreciated by those of skill in the art. Cooling air within the second platform exit cavity 332 can be ejected through a surface of the second platform 306 and into a main gaspath of the gas turbine engine. Accordingly, the second platform 306 may include one or more purge apertures 336 formed in the surface of the second platform 306 that fluidly connects the second platform exit cavity 332 with the main gaspath 338 of the gas turbine engine. Although described with the purge apertures 336 fluidly connected to the main gaspath 338, in some embodiments, some or all of the purge apertures may be arranged to eject the air into or onto mating surfaces with circumferentially adjacent vane/platforms and/or at interstage gaps with a blade outer air seal. The purge apertures may be film cooling holes that are formed having various geometric shapes, including, but not limited to one or more of cylindrical, conical, slot, diffused, shaped, single, and/or multi-lobe geometries. The geometry and/or shape may be selected based on the specific location of a particular purge aperture (e.g., gaspath or interstage gap, etc.).

Similarly, a second platform feed cavity 340 can be formed within or by the second platform 306 and fluidly connected to the second hybrid skin core cooling cavity passage 318 at the second cavity inlet 326. At the second cavity outlet 328, the second hybrid skin core cooling cavity passage 318 is fluidly connected to a first platform exit cavity 342. Cooling air within the first platform exit cavity 342 can be ejected through a surface of the first platform 306 and into the main gaspath 338 of the gas turbine engine. One or more purge apertures 344 formed in the first platform 304 provide a fluid connection between the first platform exit cavity 342 and the main gaspath 338.

The platform exit cavities 332, 342 are arranged to provide a pressure differential to pull the cooling air from the respective platform feed cavities 330, 340. The purge apertures 336, 344 can be arranged to form a film along a surface of the respective platforms 304, 306 within the main gaspath 338. Further, in some embodiments, some or all of the purge apertures can be arranged to purge the air to locations of the platforms 304, 306 not exposed to the main gaspath 338. Sufficient backside cooling is generated within hybrid skin core cooling cavity passages 316, 318 due to the pressure differential generated by the purge apertures 336, 344 that the need for additional film cooling holes connecting the airfoil portion of hybrid skin core cooling cavity passages 316, 318 to the main gaspath to provide a protective cooling film are not necessary.

As shown, each of the first and second hybrid skin core cooling cavity passages 316, 318 tapers or narrows from the respective inlet 322, 326 to the respective outlet 324, 328. That is, as the first hybrid skin core cooling cavity passage transitions from the first cavity inlet 322 to the first cavity outlet 324, the first cavity width $W_1$ decreases in dimension. Similarly, as the second hybrid skin core cooling cavity passage transitions from the second cavity inlet 326 to the second cavity outlet 328, the second cavity width $W_2$ decreases in dimension. The tapering features of the hybrid skin core cooling cavity passages can be provided to control and/or ensure sufficient convective cooling to be applied to the hot wall of the respective hybrid skin core cooling cavity passages.

Although shown herein with two hybrid skin core cooling cavity passages formed on a suction side of an airfoil, those of skill in the art will appreciate that other airfoil configurations are possible without departing from the scope of the present disclosure. For example, in some embodiments, a single hybrid skin core cooling cavity passage can be provided with a single direction of flow therethrough. Further, although shown with two adjacent hybrid skin core cooling cavity passages having counter flow directions, in some embodiments, the direction of flow through the two hybrid skin core cooling cavity passages can be the same. Moreover, although shown and described with respect to hybrid skin core cooling cavity passages, those of skill in the art will appreciate that conventional cavities of airfoils can incorporate embodiments described herein. Additionally, hybrid skin core cooling cavity passages may connect through the pressure side of the airfoil in a similar manner.

Further, as shown in FIG. 3B, one or more of the hybrid skin core cooling cavity passages may include thermal transfer augmentation features. For example, as shown, the first hybrid skin core cooling cavity passage 316 includes a plurality of thermal transfer augmentation features 346. Thermal heat transfer augmentation features in accordance with the present disclosure may comprise of various geometric shapes and types. For example, internal heat transfer augmentation features may include, but are not limited to, trip strips, tabulators, pin fins, pedestals, dimples, etc. that may be used independently and/or in conjunction with one another in order to provide the desired and optimal heat transfer, pressure loss, and cooling air temperature heat pickup required to achieve local metal temperature and durability oxidation, creep, and thermal mechanical fatigue requirements.

Advantageously, embodiments provided herein are directed to cooling schemes for airfoils of gas turbine engines that enable passive cooling to hot walls of the airfoils without using film cooling. Further, advantageously, embodiments provided herein can enable improved TSFC by reducing required film flow. Moreover, advantageously, embodiments provided herein enable dual-cooling capability through simultaneously cooling portions of an airfoil body and also platform circuits. Furthermore, advantageously, embodiments provided herein provide effective and efficient utilization of cooling air.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
   an airfoil body extending between a first platform and a second platform;
   a first platform feed cavity defined by the first platform;
   a second platform exit cavity defined by the second platform;
   a first hybrid skin core cooling cavity passage formed within the airfoil body and fluidly connecting the first platform feed cavity to the second platform exit cavity, the first hybrid skin core cooling cavity having a variable first cavity width that converges along a flow direction from the first platform feed cavity to the second platform exit cavity, the first hybrid skin core cooling cavity arranged along a suction side of the airfoil body; and
   at least one purge aperture formed in the second platform and fluidly connecting the second platform exit cavity to an exterior of the second platform,
   wherein the airfoil body does not include any apertures fluidly connecting the first hybrid skin core cooling cavity passage to an exterior of the airfoil body,
   a second platform feed cavity defined by the second platform;
   a first platform exit cavity defined by the first platform;
   a second hybrid skin core cooling cavity passage formed within the airfoil body and fluidly connecting the second platform feed cavity to the first platform exit cavity, the second hybrid skin core cooling cavity arranged adjacent the first hybrid skin core cooling cavity along the suction side of the airfoil body; and
   at least one purge aperture formed in the first platform fluidly connecting the first platform exit cavity to an exterior of the first platform,
   wherein the airfoil body does not include an apertures fluidly connecting the second hybrid skin core cooling cavity passage to an exterior of the airfoil body.

2. The airfoil of claim 1, further comprising at least one thermal transfer augmentation feature within the first hybrid skin core cooling cavity passage.

3. The airfoil of claim 1, further comprising at least one thermal transfer augmentation feature within the second hybrid skin core cooling cavity passage.

4. The airfoil of claim 1, wherein the second hybrid skin core cooling cavity has a variable second cavity width that converges along a flow direction from the second platform feed cavity to the first platform exit cavity.

5. The airfoil of claim 1, further comprising:
   a leading edge cavity within the airfoil body; and
   a trailing edge cavity within the airfoil body.

6. The airfoil of claim 5, wherein the first hybrid skin core cooling cavity passage is positioned within the airfoil body such that the first hybrid skin core cooling cavity passage is defined between an exterior surface of the airfoil body and an interior wall that defines a wall of the trailing edge cavity.

7. The airfoil of claim 1, wherein the first platform feed cavity is defined in part by a cover plate installed to the first platform.

8. The airfoil of claim 1, wherein the second platform exit cavity is defined in part by a cover plate installed to the second platform.

9. A gas turbine engine comprising:
   an airfoil comprising:
   an airfoil body extending between a first platform and a second platform;
   a first platform feed cavity defined by the first platform;
   a second platform exit cavity defined by the second platform;
   a first hybrid skin core cooling cavity passage formed within the airfoil body and fluidly connecting the first platform feed cavity to the second platform exit cavity, the first hybrid skin core cooling cavity having a variable first cavity width that converges along a flow direction from the first platform feed cavity to the second platform exit cavity, the first hybrid skin core cooling cavity arranged along a suction side of the airfoil body; and
   at least one purge aperture formed in the second platform and fluidly connecting the second platform exit cavity to an exterior of the second platform,
   wherein the airfoil body does not include any apertures fluidly connecting the first hybrid skin core cooling cavity passage to an exterior of the airfoil body,
   a second platform feed cavity defined by the second platform;
   a first platform exit cavity defined by the first platform;
   a second hybrid skin core cooling cavity passage formed within the airfoil body and fluidly connecting the second platform feed cavity to the first platform exit cavity, the second hybrid skin core cooling cavity having a variable second cavity width that converges along a flow direction from the second platform feed cavity to the first platform exit cavity, the second hybrid skin core cooling cavity arranged adjacent the first hybrid skin core cooling cavity along the suction side of the airfoil body, and
   at least one purge aperture formed in the first platform and fluidly connecting the first platform exit cavity to an exterior of the first platform,
   wherein the airfoil body does not include any apertures fluidly connecting the second hybrid skin core cooling cavity passage to an exterior of the airfoil body.

10. The gas turbine engine of claim 9, the airfoil further comprising at least one thermal transfer augmentation feature within the first hybrid skin core cooling cavity passage.

11. The gas turbine engine of claim 9, the airfoil further comprising:
    a leading edge cavity within the airfoil body; and
    a trailing edge cavity within the airfoil body.

12. The gas turbine engine of claim 11, wherein the first hybrid skin core cooling cavity passage is positioned within the airfoil body such that the first hybrid skin core cooling cavity passage is defined between an exterior surface of the airfoil body and an interior wall that defines a wall of the trailing edge cavity.

13. The gas turbine engine of claim 9, wherein at least one of the first platform feed cavity and the second platform exit is defined in part by a cover plate installed to the respective first platform or second platform.

14. The gas turbine engine of claim 9,
    wherein the airfoil is installed within a main gaspath of the gas turbine engine, and wherein the at least one purge aperture is arranged to purge air from within the second platform exit cavity into the main gaspath.

15. An airfoil for a gas turbine engine, the airfoil comprising:
an airfoil body extending between a first platform and a second platform;
a first platform feed cavity defined by the first platform;
a second platform exit cavity defined by the second platform;
a first hybrid skin core cooling cavity passage formed within the airfoil body and fluidly connecting the first platform feed cavity to the second platform exit cavity, the first hybrid skin core cooling cavity arranged along a suction side of the airfoil body; and
at least one purge aperture formed in the second platform and fluidly connecting the second platform exit cavity to an exterior of the second platform,
wherein the airfoil body does not include any apertures fluidly connecting the first hybrid skin core cooling cavity passage to an exterior of the airfoil body,
a second platform feed cavity defined by the second platform;
a first platform exit cavity defined by the first platform;
a second hybrid skin core cooling cavity passage formed within the airfoil body and fluidly connecting the second platform feed cavity to the first platform exit cavity, the second hybrid skin core cooling cavity having a variable second cavity width that converges along a flow direction from the second platform feed cavity to the first platform exit cavity, the second hybrid skin core cooling cavity arranged adjacent the first hybrid skin core cooling cavity along the suction side of the airfoil body; and
at least one purge aperture formed in the first platform and fluidly connecting the first platform exit cavity to an exterior of the first platform,
wherein the airfoil body does not include any apertures fluidly connecting the second hybrid skin core cooling cavity passage to an exterior of the airfoil body.

16. The airfoil of claim 15, further comprising at least one thermal transfer augmentation feature within at least one of the first hybrid skin core cooling cavity passage and the first hybrid skin core cooling cavity passage.

17. The airfoil of claim 15, further comprising:
a leading edge cavity within the airfoil body; and
a trailing edge cavity within the airfoil body.

18. The airfoil of claim 17, wherein the first hybrid skin core cooling cavity passage is positioned within the airfoil body such that the first hybrid skin core cooling cavity passage is defined between an exterior surface of the airfoil body and an interior wall that defines a wall of the trailing edge cavity.

19. The airfoil of claim 15, wherein the first platform feed cavity is defined in part by a cover plate installed to the first platform.

20. The airfoil of claim 15, wherein the second platform exit cavity is defined in part by a cover plate installed to the second platform.

* * * * *